United States Patent
Baba

(10) Patent No.: US 8,990,632 B2
(45) Date of Patent: Mar. 24, 2015

(54) SYSTEM FOR MONITORING STATE INFORMATION IN A MULTIPLEX SYSTEM

(75) Inventor: Kiyoshi Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 13/609,556

(22) Filed: Sep. 11, 2012

(65) Prior Publication Data
US 2013/0080840 A1 Mar. 28, 2013

(30) Foreign Application Priority Data
Sep. 27, 2011 (JP) .................................. 2011-210049

(51) Int. Cl.
G06F 11/00 (2006.01)
G06F 11/30 (2006.01)
G06F 11/20 (2006.01)

(52) U.S. Cl.
CPC ........ *G06F 11/3006* (2013.01); *G06F 11/3055* (2013.01); *G06F 11/3062* (2013.01); *G06F 11/202* (2013.01)
USPC .......................................... 714/44; 714/47.1

(58) Field of Classification Search
USPC ................................... 714/47.1, 44
See application file for complete search history.

(56) References Cited

U.S. PATENT DOCUMENTS

| | | | | |
|---|---|---|---|---|
| 6,721,907 B2 * | 4/2004 | Earl | ................................ | 714/57 |
| 6,738,930 B1 * | 5/2004 | Medin et al. | ..................... | 714/30 |
| 6,895,285 B2 * | 5/2005 | Maity | ............................. | 700/27 |
| 7,219,254 B2 * | 5/2007 | Rathunde et al. | .................. | 714/1 |
| 7,428,655 B2 * | 9/2008 | Pomaranski et al. | ............. | 714/3 |
| 2007/0028148 A1 * | 2/2007 | Kulidjian et al. | ................ | 714/47 |
| 2008/0028402 A1 | 1/2008 | Senoo | | |
| 2008/0091746 A1 * | 4/2008 | Hatasaki et al. | .............. | 707/204 |
| 2009/0083735 A1 | 3/2009 | Kimura | | |

FOREIGN PATENT DOCUMENTS

| | | | |
|---|---|---|---|
| JP | 8-251814 | A | 9/1996 |
| JP | 10-150479 | A | 6/1998 |
| JP | 2001-60160 | A | 3/2001 |
| JP | 2006-172050 | A | 6/2006 |
| JP | 2008-33483 | A | 2/2008 |
| JP | 2008033483 | A | 2/2008 |
| JP | 2008-225567 | A | 9/2008 |
| JP | 2009-80695 | A | 4/2009 |

(Continued)

OTHER PUBLICATIONS

Japanese Office Action for JP Application No. 2011-210049 mailed on Mar. 4, 2014 with Partial English Translation.

(Continued)

*Primary Examiner* — Philip Guyton
(74) *Attorney, Agent, or Firm* — Sughrue Mion, PLLC

(57) ABSTRACT

A multiplex system includes physical machines, and data communication cards respectively installed in the physical machines. If one of the physical machines equipped with an own data communication card is a physical machine of an own system and another one of the physical machines is a physical machine of another system, the data communication cards connect the physical machine of the own system and the physical machine of the other system communicably with each other over a communication network. Further, the data communication cards autonomously monitor the states of the physical machine of the own system and the physical machine of the other system and detect an abnormal state.

13 Claims, 6 Drawing Sheets

(56) References Cited

FOREIGN PATENT DOCUMENTS

| | | |
|---|---|---|
| JP | 4468426 B2 | 4/2009 |
| JP | 2009080692 A | 4/2009 |
| JP | 2009-205334 A | 9/2009 |
| JP | 2010-20505 A | 1/2010 |
| JP | 2010-79789 A | 4/2010 |
| JP | 2011-22957 A | 2/2011 |
| JP | 2011-134314 A | 7/2011 |

OTHER PUBLICATIONS

Japanese Office Action for JP Application No. 2011-210049 mailed on Aug. 7, 2013 with English Translation.

* cited by examiner

SYSTEM FOR MONITORING STATE INFORMATION IN A MULTIPLEX SYSTEM

INCORPORATION BY REFERENCE

This application is based upon and claims the benefit of priority from Japanese patent application No. 2011-210049, filed on Sep. 27, 2011, the disclosure of which is incorporated herein in its entirety by reference.

TECHNICAL FIELD

The present invention relates to a multiplex system, and in particular, to a multiplex system implementing a fault tolerant system or a cluster system, a data communication card, and an abnormal state detection method.

BACKGROUND ART

In recent years, computers have established the foundation of society, and service outages due to a failure may cause a heavy loss. Accordingly, it is required to continue services even if a failure occurs. As such, a fault tolerant technology using a multiplex system has drawn attention.

For example, a fault tolerant system at a hardware (HW) level has been known conventionally. In such a system, a lock-step operation is performed via dedicated hardware (HW) and the operation is continued by performing switching between multiplex (usually duplex) hardware main components without any delay when a failure occurs.

Further, a fault tolerant system at a software (SW) level has been studied in recent years. In such a system, if a failure occurs due to a fault or the like in the hardware (HW) on a physical machine where a virtual machine operates, the processing performed by the virtual machine is continuously performed by a virtual machine standing by on another physical machine.

It should be noted that a virtual machine is a virtually implemented machine realized by operating a plurality of operating systems (OS) on a physical machine by the virtualization technology. With the virtualization technology, a plurality of virtual machines of low utilization can be integrated on one physical machine, whereby the utilization efficiency per physical machine can be improved, and also power consumption can be suppressed by reducing the number of physical machines. The virtualization technology includes a model in which a layer allowing a virtual machine to operate is provided above the host OS running on the physical machine and a guest OS is allowed to run on such a layer, and a model in which a hypervisor allowing a virtual machine to operate is provided on the hardware (HW) without a host OS and a guest OS is allowed to run on the hypervisor.

For example, as first related art of the present invention, a technique of implementing duplexing by combining virtual computers, respectively operating on two independent computers, has been proposed (see JP 4468426 B (Patent Document 1), for example). To be more specific, an acquisition unit, included in a first hypervisor managing a first virtual computer, acquires synchronization information associated with an event accompanying an input to the first virtual computer. Further, in accordance with the synchronization information, a control unit, included in a second hypervisor managing a second virtual computer, performs control to match an execution state pertaining to an input to the second virtual computer with an execution state pertaining to an input to the first virtual computer. Thereby, duplexing is implemented by combining the virtual computers respectively operating on the two independent computers.

Further, as second related art of the present invention, a service taking-over control method in a virtual machine system has been proposed (see JP 2009-080692 A (Patent Document 2), for example). To be more specific, when a failure occurs in a physical computer in which a virtual machine is operating, a virtual machine monitor regenerates the virtual machine, in which the failure has occurred, as another virtual machine on another physical computer, based on a snap shot taken by a disk device at a point of time closest to the failure occurrence time. Further, based on the communication history associated with the virtual machine in which the failure has occurred, a state reproduction section of a communication recording unit makes the regenerated virtual machine to reproduce the state of the virtual machine during the period from the time when the snap shot was taken to the failure occurrence time. Further, if reproduction of the state of the virtual machine fails, a restart section restarts the virtual machine on the server computer. Thereby, when a failure occurs in the physical computer on which the virtual machine is operating, the service is taken over by the virtual machine regenerated or restarted on another physical computer.

Further, as third related art of the present invention, a method of transferring a computer operation environment has been proposed (see JP 2008-033483 A (Patent Document 3), for example). To be more specific, first, an operation of a first computer is suspended. Next, a list of files included in a copy image on a first disk is created. Then, execution context of the first computer is copied to the second computer. Then, the operation is restarted in the second computer. Then, with reference to the list, the copy image is copied from the first disk to the second disk. Thereby, the service suspended time, when transferring the operation environment of the first computer using the first disk to the second computer using the second disk, is reduced.

Further, in a multiplex system implementing the above-described fault tolerant system or the cluster system, detection of a failure of a physical machine is realized by a function of server vital checking by heartbeat of cluster software, operation management software, or the like (see paragraph 0038 of Patent Document 2, for example). Further, as an error detection mechanism of general purpose hardware (HW), a mechanism of detecting a memory failure using error checking and correcting codes has been known.

Patent Document 1: JP 4468426 B
Patent Document 2: JP 2009-080692 A
Patent Document 3: JP 2008-033483 A However, a method of monitoring the state of a physical machine by software running on the physical machine constituting a multiplex system and detecting an abnormal state, such as server vital checking by heartbeat, and a method of detecting a failure by an error detection mechanism of hardware implemented on a physical machine, such as error checking and correcting codes, are directly affected by the state of the physical machine. As such, those methods may fail to detect an abnormal state. For example, if a hardware failure occurs in a physical machine, which causes a stop of the software monitoring the state of the physical machine, it is difficult to detect an abnormal state. Further, in a device not operating usually such as a device of a standby system (subsystem) in a multiplex system, as an error detection mechanism of hardware implemented therein has no opportunity to function practically, it is difficult to detect a failure.

SUMMARY

An exemplary object of the present invention is to provide a multiplex system capable of solving the above-described problem, that is, a problem that a method of monitoring the state of a physical machine using software running on the physical machine or using an error detection mechanism implemented on the physical machine and detecting an abnormal state is likely to be affected by the state of the physical machine so that such a method may fail to detect an abnormal state.

A multiplex system, according to an aspect of the present invention, includes a plurality of physical machines; and a plurality of data communication cards respectively installed in the plurality of the physical machines, wherein if one of the physical machines equipped with an own data communication card is a physical machine of an own system and another one of the physical machines is a physical machine of another system, the data communication cards connect the physical machine of the own system and the physical machine of the other system communicably with each other over a communication network, and autonomously monitor the states of the physical machine of the own system and the physical machine of the other system and detect an abnormal state.

Further, a data communication card, according to another aspect of the present invention, is a data communication card installed in each of physical machines, including: if one of the physical machines equipped with an own data communication card is a physical machine of an own system and another one of the physical machines is a physical machine of another system, a unit that connects the physical machine of the own system and the physical machine of the other system communicably with each other over a communication network, and autonomously monitors the states of the physical machine of the own system and the physical machine of the other system and detects an abnormal state.

Further, an abnormal state detection method, according to another aspect of the present invention, is a method of detecting an abnormal state of a multiplex system including a plurality of physical machines, including by a plurality of data communication cards respectively installed in the plurality of the physical machines, if one of the physical machines equipped with an own data communication card is a physical machine of an own system and another one of the physical machines is a physical machine of another system, connecting the physical machine of the own system and the physical machine of the other system communicably with each other over a communication network, and autonomously monitoring the states of the physical machine of the own system and the physical machine of the other system and detecting an abnormal state.

As the present invention is configured as described above, the present invention is able to monitor the states of physical machines and detect an abnormal state, irrespective of the states of the physical machines.

EXEMPLARY EMBODIMENT

Hereinafter, an exemplary embodiment of the present invention will be described with reference to the accompanying drawings.

[Basic Configuration]

Figure 1:
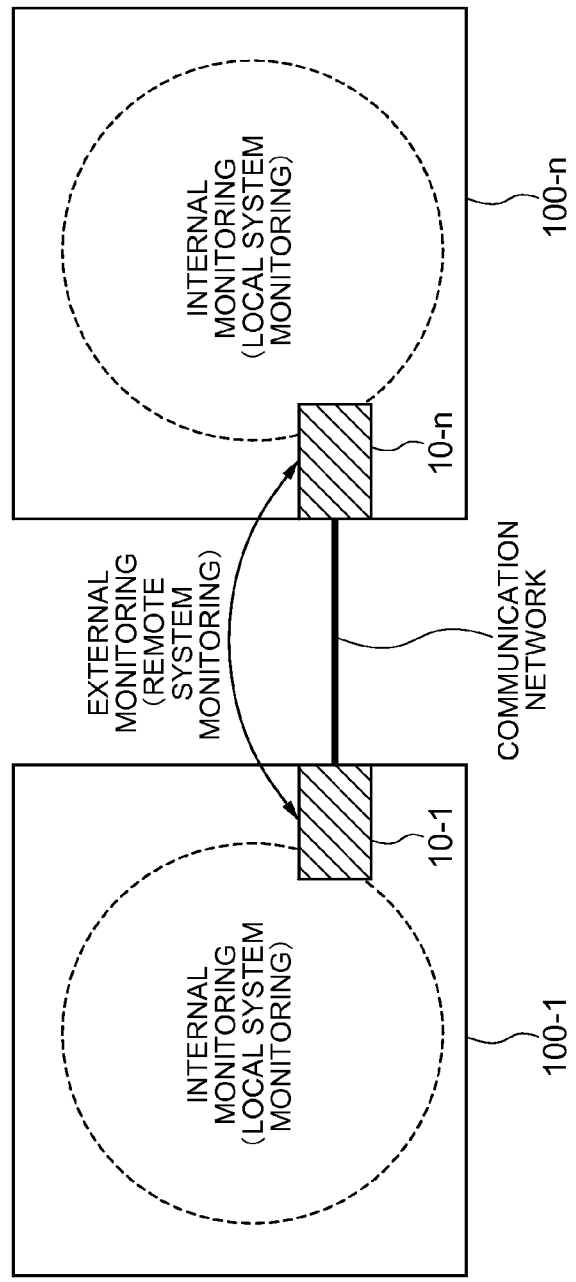
FIG. 1 is a schematic diagram showing the basic configuration of a multiplex system according to an exemplary embodiment of the present invention.

As shown in FIG. 1, a multiplex system according to the present embodiment includes a plurality of physical machines 100 (100-$i$, i=1~n: n represents the number of machines).

In this embodiment, examples of the respective physical machines 100 (100-$i$, i=1~n) include computers such as PCs (personal computers), appliances, thin client servers, workstations, mainframes, and super computers. It should be noted that the physical machines 100 (100-$i$, i=1~n) may be relay devices, rather than terminals or servers. Examples of the relay devices include network switches, routers, proxies, gateways, firewalls, load balancers, packet shapers, SCADA (Supervisory Control And Data Acquisition), gatekeepers, base stations, access points (AP), and computers having communication ports.

Although not shown, the above-mentioned computers, relay devices, and the like are implemented by processors which are driven based on programs and perform predetermined processing, memories storing such programs and various kinds of data, and interfaces.

Examples of the above-mentioned processors include CPU (Central Processing Unit), network processors (NP), microprocessors, microcontrollers, and semiconductor integrated circuits (IC) having dedicated functions.

Examples of the above-mentioned memories include semiconductor memory units such as RAM (Random Access Memory), ROM (Read Only Memory), EEPROM (Electrically Erasable and Programmable Read Only Memory), and flash memories. Other examples of the above-mentioned memories include auxiliary storage units such as HDD (Hard Disk Drive) and SSD (Solid State Drive), removable disks such as DVD (Digital Versatile Disk), and storage media such as SD (Secure Digital) memory cards. Further, the above-mentioned memories may be buffers or registers. Further, the above-mentioned memories may be storage devices using DAS (Direct Attached Storage), FC-SAN (Fibre Channel-Storage Area Network), NAS (Network Attached Storage), IP-SAN (IP-Storage Area Network), and the like.

It should be noted that the processor and the memory may be integrally formed. For example, a one-chip microcomputer is increasingly used in recent years. As such, there is a case where a one-chip microcomputer installed in an electronic device is equipped with the processor and the memory.

Examples of the above-mentioned network interfaces include semiconductor integrated circuits such as circuit boards (mother boards, I/O boards) and chips compatible with network communications, network adapters such as NIC (Network Interface Card) and similar expansion cards, communication devices such as antennas, and communication ports.

Further, examples of the networks include the Internet, LAN (Local Area Network), wireless LAN, WAN (Wide Area Network), backbones, Cable Television (CATV) networks, fixed-line telephone networks, mobile telephone networks, WiMAX (IEEE 802.16a), 3G ($3^{rd}$ Generation), lease lines, IrDA (Infrared Data Association), Bluetooth (registered trademark), serial communication networks, and data buses.

However, the present invention is not limited to these examples in practice.

In the present embodiment, each physical machine 100 (100-$i$, i=1~n) is equipped with a data communication card 10 which may be inserted, built-in, embedded, connected, or the like. However, the method of installing the card is not limited to these examples in practice.

The data communication card 10 is a highly-functional extension card which can be installed in the physical machine 100 (100-$i$, i=1~n). The data communication card 10 may have a function of a network interface as described above. The data communication card 10 incorporates an LSI (Large Scale Integration). The data communication card 10 connects to another data communication card over a communication network to transmit and receive data with each other. Further, the data communication card 10 has a fault detection function, and autonomously detects a fault in the physical machine in which the card is installed, or a fault in another physical machine in which the other data communication card is installed. Autonomously detecting a fault in a physical machine means detecting a fault in the physical machine by the hardware of the data communication card 10, without depending on the software of the physical machine. A fault in the other physical machine may be recognized by a notification from the other data communication card.

It should be noted that the form of the data communication card 10 is not limited to a card form. For example, the data communication card 10 may be integrated with the circuit board of the physical machine 100 (100-$i$, i=1~n). However, it is not limited to these examples in practice.

If an environment in which the data communication card 10 can be used has been set on the physical machine 100 (100-$i$, i=1~n), and capable software has been introduced or can be introduced, the physical machine 100 (100-$i$, i=1~n) may serve as an FT (Fault Tolerant) server or a cluster server by only inserting the data communication card 10 into the physical machine 100 (100-$i$, i=1~n). In the case of implementing a fault tolerant system or a cluster system at a software level, the data communication card 10 may have setting information, image files, and the like for a virtual machine and provide the physical machine 100 (100-$i$, i=1~n) with them. In that case, the data communication card 10 may be called as an "FT card" or a "cluster card".

[Internal Configuration of Physical Machine]

Figure 2:
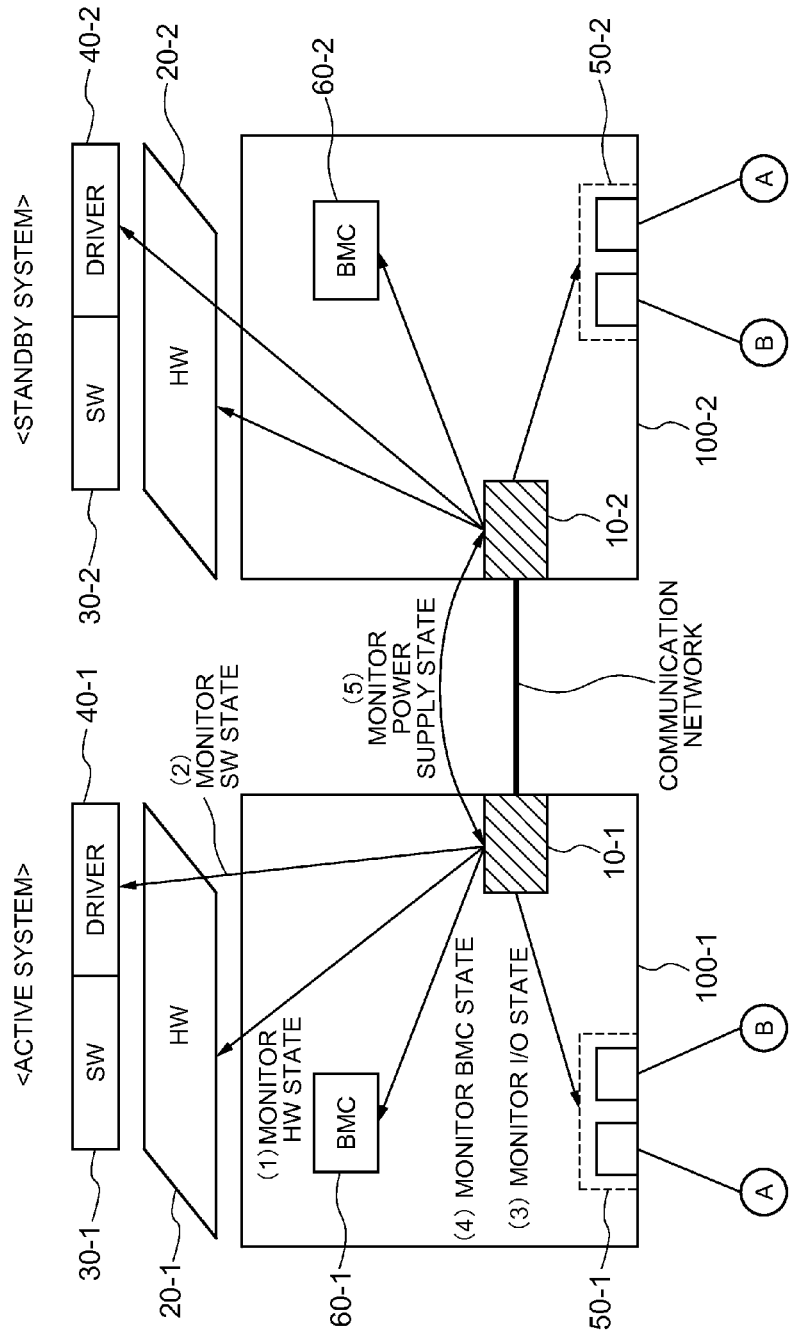
FIG. 2 is a schematic diagram showing an exemplary configuration of a physical machine according to the exemplary embodiment of the present invention.

With reference to FIG. 2, the internal configuration of each physical machine 100 (100-$i$, i=1~n) will be described in detail.

Each physical machine 100 (100-$i$, i=1~n) includes the data communication card 10, hardware (HW) 20, software (SW) 30, a driver 40, an I/O (Input/Output) chip 50, and a BMC (Baseboard Management Controller) 60. It should be noted that the power of the physical machine 100 has two systems including main power and standby power. During the time that the AC power code of the physical machine 100 is connected with an AC outlet, the standby power is ON. In the state where the standby power is ON, the main power can be switched from OFF to ON, or vice versa. Both the main power and the standby power are DC power.

In the present embodiment, an example will be given using two physical machines (physical machine 100-1 and physical machine 100-2). For example, the physical machine 100-1 includes a data communication card 10-1, hardware (HW) 20-1, software (SW) 30-1, a driver 40-1, a BMC 60-1, and an I/O chip 50-1. Further, the physical machine 100-2 includes a data communication card 10-2, hardware (HW) 20-2, software (SW) 30-2, a driver 40-2, a BMC 60-2, and an I/O chip 50-2.

The configuration of the data communication card 10 is as described above.

The hardware (HW) 20 is hardware (HW) inside the physical machine 100 (100-$i$, i=1~n). In general, the hardware (HW) 20 is driven by the power supplied from the DC power. As an example, the hardware (HW) 20 may be a processor, a memory, an auxiliary storage unit, a network interface, a PCI (Peripheral Components Interconnect bus) slot, or a power supply unit, or a combination thereof. It should be noted that the hardware (HW) 20 may be multiplexed in the same physical machine.

The software (SW) 30 is software which operates on the physical machine 100 (100-$i$, i=1~n) using the hardware (HW) 20. As an example, the software (SW) 30 may be an OS, application software, or middleware. It should be noted that the software (SW) 30 may be a virtual machine (VM) constructed on the physical machine.

The driver 40 is a software (SW)/device driver for controlling and operating devices installed in the physical machine 100 (100-$i$, i=1~n) and equipment connected externally. The driver 40 serves as an intermediary for the OS to control the equipment as described above. The driver 40 may be built in the OS and act as a part of the function of the OS. As such, the driver 40 may be a part of the software (SW) 30. The driver 40 works such that when the software (SW) 30 uses an external device connected with the I/O chip 50, the driver 40 is in charge of the correspondence between the abstracted API and the device by allowing the software (SW) 30 to utilize the function of the device by means of the shared API (Application Programming Interface) provided by the OS.

The I/O chip 50 is a connection port (physical port) provided to the physical machine 100 (100-$i$, i=1~n), connecting to the main unit of the physical machine and to various kinds of peripheral equipment, and serving as an input/output interface for exchanging data with such equipment. As main standards of input/output interfaces, PS/2 for connecting a keyboard and a mouse, RS232C of a serial interface for bidirectional communications with a modem and a printer, SCSI of a parallel interface for bidirectional connections with a hard disk drive (HDD) or the like, IDE of a parallel interface for bidirectional connections mainly with a built-in HDD or the like, USB of a serial interface for bidirectional connections between the main unit and the peripheral equipment, and IEEE1394 which is a next-generation high-speed SCSI standard, have been known. It should be noted that the I/O chip 50 may be a super I/O (Input/Output) chip or an ICH (I/O Controller Hub).

The BMC 60 is a controller provided inside the physical machine 100 (100-$i$, i=1~n). The BMC 60 regularly monitors the state of the hardware (HW) 20, and notifies the OS and the like of an occurrence of a hardware (HW) error. Specifically, the BMC 60 regularly monitors the supply voltage from the power supply unit, the number of rotation of the cooling fan, the temperatures of various kinds of components including processors, the power supply voltage of the SCSI terminator, and the like. The BMC 60 is driven by power supplied from the standby power. Accordingly, even if the main power of the main unit is OFF, if the power supply code from an outlet is connected with the power supply unit, power is supplied to the BMC 60. As such, even if the main power of the main unit is OFF, the BMC 60 continues monitoring of the state of the hardware (HW) 20.

Some exemplary system configurations for implementing the data communication card 10 on a physical machine will be shown below.

[System Configuration 1 (Independent Data Communication Card)]

Figure 5:
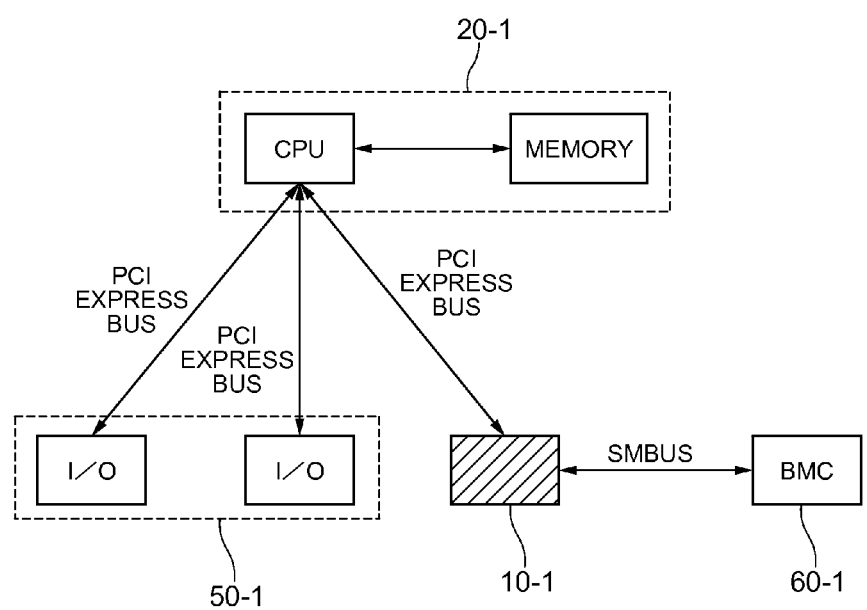
FIG. 5 is a schematic diagram showing an example of a system configuration of a multiplex system according to the present invention.

Referring to FIG. 5, a "system configuration 1" in which the data communication card 10 is provided independent of the circuit board of the physical machine 100 (100-*i*, i=1~n) will be described.

In this example, the data communication card 10 is an extension card inserted in a card slot of the physical machine 100 (100-*i*, i=1~n). It should be noted that the form of the data communication card 10 is not limited to a card form.

The data communication card 10 connects to the I/O chip 50 via a processor (CPU or the like) which is one of the hardware (HW) 20 components.

For example, the data communication card 10 connects to a processor (CPU or the like) which is one of the hardware (HW) 20 components inside the physical machine 100 (100-*i*, i=1~n) via the PCI Express bus. This processor (CPU or the like) connects to the I/O chip 50 via the PCI Express bus.

Further, the data communication card 10 connects to the BMC 60 via the SMBus.

[System Configuration 2 (Integrated Data Communication Card)]

Figure 6:
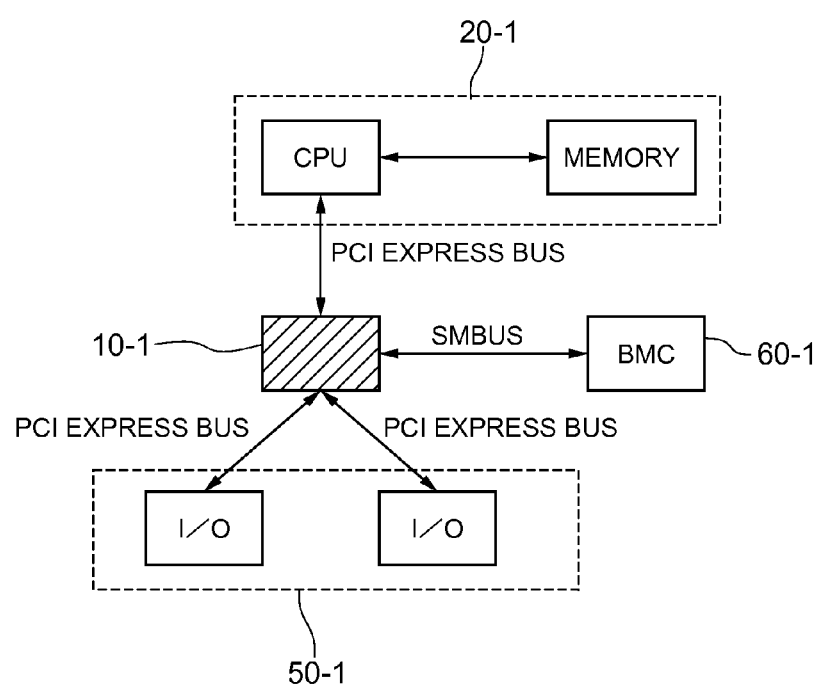
FIG. 6 is a schematic diagram showing another example of a system configuration of a multiplex system according to the present invention.

Referring to FIG. 6, a "system configuration 2" in which the data communication card 10 is integrated with the circuit board of the physical machine 100 (100-*i*, i=1~n) will be described.

In this example, the data communication card 10 is a chip mounted on the circuit board of the physical machine 100 (100-*i*, i=1~n). In this case, the circuit board of the physical machine 100 (100-*i*, i=1~n) has a function as the data communication card 10. As such, the circuit board of the physical machine 100 (100-*i*, i=1~n) corresponds to the data communication card 10.

The data communication card 10 is present between a processor (CPU or the like) which is one of the hardware (HW) 20 components and the I/O chip 50, and monitors communications between the processor (CPU or the like) and the I/O chip 50.

For example, a processor (CPU or the like) which is one of the hardware (HW) 20 components inside the physical machine 100 (100-*i*, i=1~n) connects to the data communication card 10 via the PCI Express bus. The data communication card 10 connects to the PO chip 50 via the PCI Express bus.

Further, the data communication card 10 connects to the BMC 60 via the SMBus.

[Details of Data Communication Card]

Figure 3:
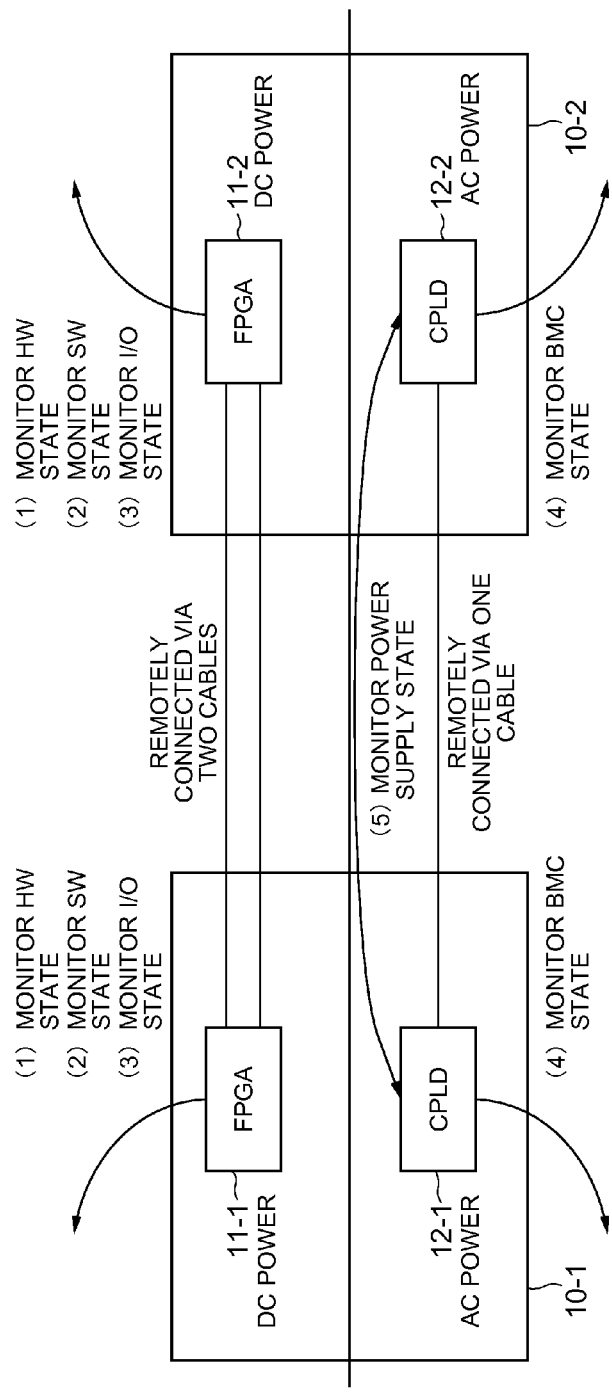
FIG. 3 is a schematic diagram showing an exemplary configuration of a data communication card according to the exemplary embodiment of the present invention.

Referring to FIG. 3, the details of the data communication card 10 will be described.

Here, description will be given using an FPGA (Field Programmable Gate Array) and a CPLD (Complex Programmable Logic Device) as examples of LSIs installed in the data communication card 10. It should be noted that the FPGA and the CPLD are just examples, and other LSIs may be used in practice.

The data communication card 10 includes an FPGA 11 and a CPLD 12.

For example, the data communication card 10-1 includes an FPGA 11-1 and a CPLD 12-1. The data communication card 10-2 includes an FPGA 11-2 and a CPLD 12-2.

The FPGA 11 is a first LSI. The FPGA 11 monitors the states of the hardware (HW) 20, the software (SW) 30, and the I/O chip 50. To the FPGA 11, the main power (DC power received by the data communication card 10) is supplied.

The CPLD 12 is a second LSI. The CPLD 12 monitors the states of the BMC 60 and the power supply unit. To the CPLD 12, the standby power (DC power generated from the AC power received by the data communication card 10) is supplied. It should be noted that the standby power is an output for supplying a regular constant output for performing power supply management. The circuit for outputting the standby power operates even if the main power is turned off.

The FPGA 11 and the CPLD 12 are communicable with each other.

[Details of FPGA and CPLD]

Figure 4:
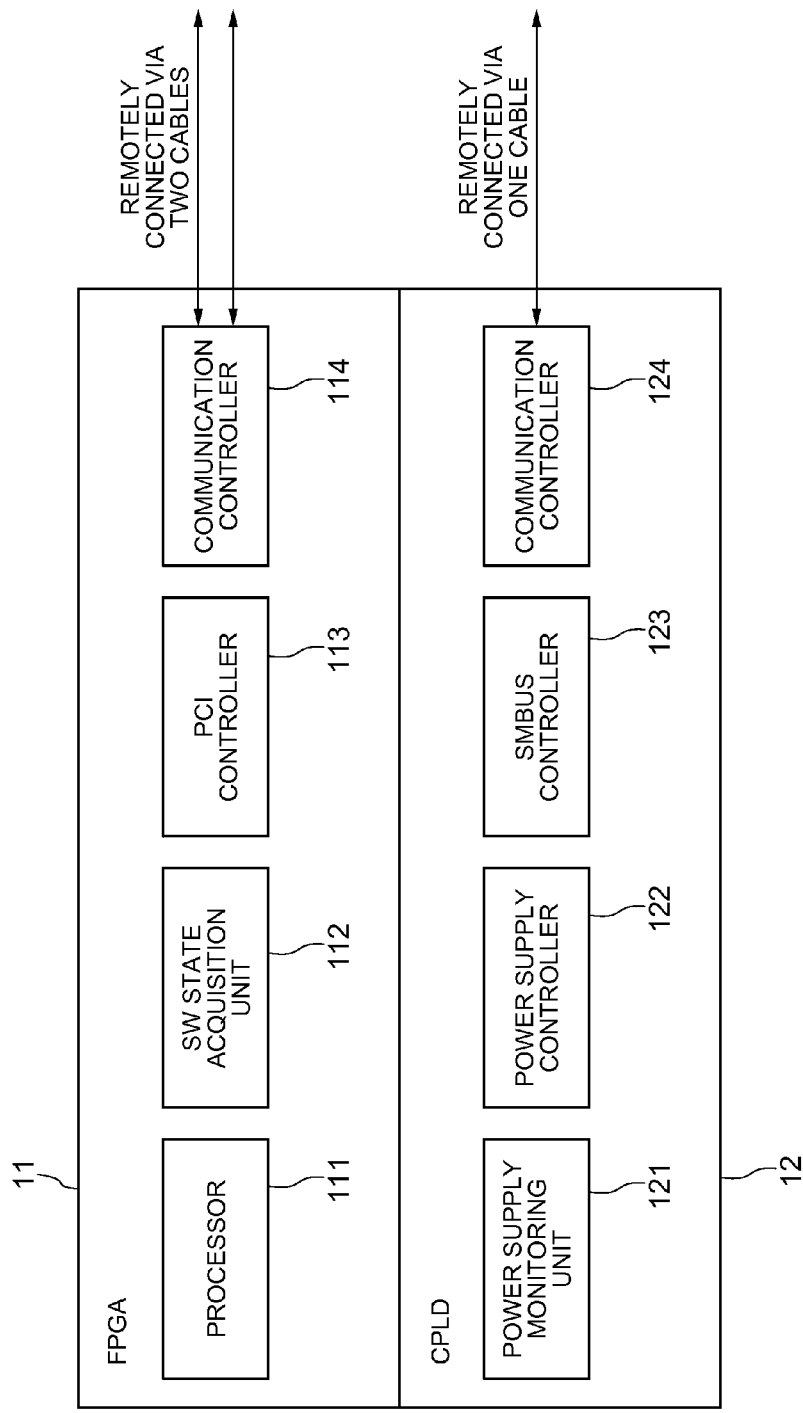
FIG. 4 is a block diagram showing the details of the inside of the data communication card according to the exemplary embodiment of the present invention.

Referring to FIG. 4, the details of the FPGA 11 and the CPLD 12 will be described.

The FPGA 11 includes a processor 111, a SW state acquisition unit 112, a PCI controller 113, and a communication controller 114.

The processor 111 performs control of the respective units inside the data communication card 10, and calculation and processing (arithmetic processing) of data. For example, the processor 111 is driven based on the program stored in the RAM or the like inside the data communication card 10, and performs predetermined processing. The processor 111 is not a processor such as a CPU included in the hardware (HW) 20 inside the physical machine 100 (100-*i*, i=1~n), but a processor disposed on the FPGA 11 inside the data communication card 10. Further, the processor 111 is able to change the operation of the SW state acquisition unit 112, the PCI controller 113, and the communication controller 114.

The SW state acquisition unit 112 acquires the state of the software (SW) 30. The SW state acquisition unit 112 may acquire the state of the software (SW) 30 by directly receiving a notification from the driver 40, or acquire the state of the software (SW) 30 set on the memory by the driver 40, via the PCI controller 113.

The PCI controller 113 connects to the hardware (HW) 20 and the I/O chip 50 inside the physical machine 100 (100-*i*, i=1~n) via the PCI Express bus, and monitors the states of the hardware (HW) 20 and the I/O chip 50.

The communication controller 114 connects to the FPGA 11 and the CPLD 12. Accordingly, the communication controller 114 is able to notify the CPLD 12 of an error detection result (abnormal state detection result) by the FPGA 11. Further, the communication controller 114 establishes a remote connection with an FPGA, installed in another data communication card, via at least one cable. In this example, it is assumed that they are connected via two cables. If a plurality of cables are used, it is possible to bundle them into one physically/logically. By bundling a plurality of cables into one, the communication speed can be doubled according to the bundled number of cables. Further, by bundling a plurality of cables into one, even if any of the cables fails, communications can be continued using the remaining cables. The communication controller 114 notifies the other data communication card of the error detection result by the FPGA 11 via the two cables.

The CPLD 12 includes a power supply monitoring unit 121, a power supply controller 122, an SMBus (System Management Bus) controller 123, and a communication controller 124.

The power supply monitoring unit 121 monitors the power supply states of the physical machine of the local machine (local system) and the remotely connected physical machine (remote system). The power supply monitoring unit 121 may directly monitor the power supply state of the local physical machine, or acquire a monitoring result by the BMC 60 via the SMBus controller 123. It should be noted that the power supply monitoring unit 121 may monitor the power supply state of the local physical machine regarding whether or not the main power is ON, whether or not the main power is OFF, whether or not the main power is switched from ON to OFF or switched from OFF to ON, and the like. Further, the power supply monitoring unit 121 may directly monitor the power supply state of the remote physical machine via the communication controller 124, or acquire a monitoring result by the BMC of the remote physical machine via the SMBus controller of the remote physical machine.

The power supply controller 122 controls the power supply states of the local physical machine and the remote physical machine. The power supply controller 122 may directly control the power supply state of the local physical machine, or control it via the SMBus controller 123 and the BMC 60. Further, the power supply controller 122 may directly control the power supply state of the remote physical machine via the communication controller 124, or control it via the SMBus controller and the BMC of the remote physical machine.

The SMBus controller 123 connects to the BMC 60 inside the physical machine 100 (100-*i*, i=1~n) via the SMBus, and acquires a monitoring result from the BMC 60. Further, the SMBus controller 123 is also able to instruct the BMC 60 to control.

The communication controller 124 connects to the FPGA 11 and the CPLD 12. Accordingly, the communication controller 124 is able to notify the FPGA 11 of an error detection result (abnormality detection result) by the CPLD 12. It should be noted that the communication controller 114 of the FPGA 11 and the communication controller 124 of the CPLD 12 may be the same device/circuit. Further, the communication controller 124 establishes a remote connection with a CPLD installed in another data communication card via at least one cable. In this example, it is assumed that they are connected via one cable. If a plurality of cables are used, the cables may be bundled into one physically/logically. The communication controller 124 notifies the other data communication card of an error detection result by the CPLD 12, via the one cable. Further, the communication controller 124 may receive power supply from the remote physical machine via the one cable. For example, the communication controller 124 uses a part of the line constituting the one cable for receiving power supply from the remote physical machine. In that case, even if the CPLD 12 is not able to receive power supply from the local physical machine, the CPLD 12 is able to continue operation by receiving power supply from the remote physical machine.

[Hardware (HW) State Monitoring]

Hereinafter, an operation of hardware (HW) state monitoring will be described in detail.

Here, as an example of hardware (HW) state monitoring, an operation of memory state monitoring will be described. It should be noted that memory state monitoring is performed only when the main power is ON (both the main power and the standby power are ON).

The PCI controller 113 monitors whether the memory operates normally by issuing a memory read request via the PCI Express bus, reading data in the memory via the CPU or the like, and checking whether a completion response is returned normally from the CPU or the like.

For example, the PCI controller 113 sequentially issues a read request to each of the memory addresses periodically at regular intervals.

It should be noted that the operation of the PCI controller 113 may be changed by the processor 111. For example, the cycle that the PCI controller 113 issues the read request may be changed by the processor 111.

In this way, the PCI controller 113 is able to detect a memory failure.

Conventionally, it has been required to actually read the memory. As such, it is impossible to detect an error until a memory read request is issued from the CPU or the like.

In the present embodiment, however, as the data communication card 10 autonomously issues a memory read request periodically irrespective of presence or absence of memory readout to thereby constantly monitor the state of the memory, an error can be detected at an early stage. Further, it is also possible to detect an error in devices which do not operate usually such as devices of a standby system (subsystem) in the multiplex system.

[Software (SW) State Monitoring]

Hereinafter, an operation of software (SW) state monitoring will be described in detail.

The SW state acquisition unit 112 acquires the state of the software (SW) 30 to thereby monitor whether the software (SW) 30 operates normally. As a state of the software (SW) 30, a count value, if the software 30 regularly counts the value of a particular memory address for example, may be used. However, the state is not limited to such a value.

The SW state acquisition unit 112 may acquire the state of the software (SW) 30 by directly receiving a notification from the driver 40, or acquire the state of the software (SW) 30 set on the memory by the driver 40, via the PCI controller 113.

Thereby, the SW state acquisition unit 112 is able to detect an abnormality in the software (SW) 30.

In general, it is difficult to detect an abnormality in software (SW) using the software (SW) monitoring a failure.

In the present embodiment, however, as the data communication card 10 monitors the state of the software (SW) 30, it is possible to detect an error in the software (SW) monitoring a failure.

[I/O Chip State Monitoring Function]

Hereinafter, an operation of an I/O chip state monitoring function will be described in detail.

It should be noted that I/O chip state monitoring is performed only when the main power is ON (both the main power and the standby power are ON).

The PCI controller 113 monitors whether the I/O chip 50 operates normally by issuing a read request of setting information (config) of the I/O chip 50 via the PCI Express bus, reading the setting information of the I/O chip directly or via the CPU or the like, and checking whether a completion response is returned normally from the I/O chip or the CPU or the like.

For example, the PCI controller 113 sequentially issues a read request to each of the I/O chips 50 periodically at regular intervals.

It should be noted that the operation of the PCI controller 113 may be changed by the processor 111. For example, the cycle that the PCI controller 113 issues the read request may be changed by the processor 111.

In this way, the PCI controller 113 is able to detect a failure of the I/O chip 50.

Conventionally, it has been required to actually read the I/O chip 50. As such, it is impossible to detect an error until a read request of the I/O chip 50 is issued from the CPU or the like.

In the present embodiment, however, as the data communication card 10 autonomously issues a read request of the I/O chip 50 periodically irrespective of presence or absence of readout of the I/O chip 50 to constantly monitor the state of the I/O chip 50, an error can be detected at an early stage.

Further, it is also possible to detect an error in devices which do not operate usually such as devices of a standby system (subsystem) in the multiplex system.

[BMC State Monitoring]

Hereinafter, an operation of BMC state monitoring will be described in detail.

It should be noted that BMC state monitoring is performed in either that the main power is ON (both the main power and the standby power are ON) or that the main power is OFF (the main power is OFF and only the standby power is ON).

The SMBus controller 123 monitors whether the BMC 60 operates normally by issuing an SMBus read request to the BMC 60 via the SMBus, reading the value of a register provided to the BMC 60, and checking whether a completion response is returned normally from the BMC 60.

For example, the SMBus controller 123 autonomously issues an SMBus read request to the BMC 60 periodically at regular intervals.

The BMC 60 is able to issue an SMBus write request to the SMBus controller 123 and write data into a register in the data communication card 10. The SMBus controller 123 may monitor whether the BMC 60 operates normally by checking whether an SMBus write request is issued from the BMC 60 at regular intervals.

It should be noted that if the main power is ON, the processor 111 is able to change the operation of the SMBus controller 123. For example, the processor 111 is able to change the cycle that the SMBus controller 123 issues the SMBus read request. Further, the processor 111 is able to control which monitoring method, that is, a method of monitoring by issuing an SMBus read request or a method of monitoring by checking an issuance of an SMBus write request, is to be used.

Thereby, the SMBus controller 123 is able to detect a failure of the BMC 60.

In the present embodiment, as the data communication card 10 issues an SMBus read request periodically to constantly monitor the state of the BMC 60, an error can be detected at an early stage.

[Power Supply State Monitoring of Local Machine]

Hereinafter, an operation of power supply state monitoring of the local machine will be described.

It should be noted that power supply state monitoring of the local machine is performed in either that the main power is ON (both the main power and the standby power are ON) or that the main power is OFF (the main power is OFF and only the standby power is ON).

The power supply monitoring unit 121 monitors the power supply state of the local physical machine. The power supply monitoring unit 121 is driven by the power supplied from the standby power.

(1) Operation when the Main Power is ON

The power supply monitoring unit 121 detects that the main power of the local physical machine is ON. The power supply monitoring unit 121 also detects that the main power of the remote physical machine is ON, via the communication controller 124.

If the power supply controller 122 detects that the main power of the remote physical machine is OFF, the power supply controller 122 turns on the main power of the remote physical machine via the communication controller 124.

It should be noted that when detecting that the main power of the local physical machine is ON, the power supply controller 122 is able to turn on the main power of the remote physical machine via the communication controller 124. Whether or not to turn on the main power of the remote physical machine can be changed by the setting. This is effective when both the local physical machine and the remote physical machine are activated simultaneously.

For example, in the case of operating a fault tolerant system at a software (SW) level, the DC power of the two physical machines (active system and standby system) must be ON. As such, when the power switch of one machine is turned on, there is an advantage (merit) if the DC power of the other machine is also turned on in conjunction with the one machine. On the contrary, when the one machine is shut down so that the DC power thereof is turned off, there is an advantage if the DC power of the other machine is also turned off in conjunction with the one machine. Whether or not the two physical machines are in conjunction with each other is not fixed but selectable.

Further, when the power supply controller 122 detects that the main power of the local physical machine is ON, the power supply controller 122 is also able to turn off the main power of the remote physical machine. Whether or not to turn off the main power of the remote physical machine can be changed by the setting. This is effective when the active system (main system) and the standby system (subsystem) are switched between the local physical machine and the remote physical machine.

(2) Operation when the Main Power is OFF

The power supply monitoring unit 121 detects that the main power of the local physical machine is OFF. Further, the power supply monitoring unit 121 detects that the main power of the remote physical machine is OFF, via the communication controller 124.

When the power supply controller 122 detects that the main power of the remote physical machine is ON, the power supply controller 122 turns off the main power of the remote physical machine via the communication controller 124.

It should be noted that when detecting that the main power of the local physical machine is OFF, the power supply controller 122 is able to turn off the main power of the remote physical machine via the communication controller 124. Whether or not to turn off the main power of the remote physical machine can be changed by the setting. This is effective when both the local physical machine and the remote physical machine are shut down simultaneously.

Further, when the power supply controller 122 detects that the main power of the local physical machine is OFF, the power supply controller 122 is also able to turn on the main power of the remote physical machine. Whether or not to turn on the main power of the remote physical machine can be changed by the setting. This is effective when the active system (main system) and the standby system (subsystem) are switched between the local physical machine and the remote physical machine.

Further, the power supply monitoring unit 121 is able to detect a failure of the main power.

In general, it is difficult to detect a power failure of a physical machine by software (SW). The reason that it is difficult to detect a failure of the main power of the local physical machine by the software (SW) of the local physical machine is that if the main power of the local physical machine failed, it is highly likely that the software (SW) of the local physical machine stops.

In the present embodiment, however, as the data communication card 10 monitors the power supply states of the local physical machine and the remote physical machine by the power supplied from the standby power, it is possible to detect a failure of the main power in the respective physical machines and to determine and specify in which physical machine the failure of the main power has occurred.

[Power Supply State Monitoring of Remote Machine]

Hereinafter, an operation of power supply state monitoring of the remote machine will be described in detail.

It should be noted that power supply state monitoring of the remote machine is performed in either that the main power is ON (both the main power and the standby power are ON) or that the main power is OFF (the main power is OFF and only the standby power is ON).

The power supply monitoring unit 121 monitors the power supply state of the remote physical machine. It should be noted that the power supply monitoring unit 121 is driven by the power supplied from the standby power.

(1) Operation when the Main Power is ON

The power supply monitoring unit 121 detects that the main power of the remote physical machine is ON, via the communication controller 124. The power supply monitoring unit 121 also detects that the main power of the local physical machine is ON.

If the power supply controller 122 detects that the main power of the local physical machine is OFF, the power supply controller 122 turns on the main power of the local physical machine.

It should be noted that when detecting that the main power of the remote physical machine is ON, the power supply controller 122 is able to turn on the main power of the local physical machine via the communication controller 124. Whether or not to turn on the main power of the local physical machine can be changed by the setting. This is effective when both the local physical machine and the remote physical machine are activated simultaneously.

Further, when the power supply controller 122 detects that the main power of the remote physical machine is ON, the power supply controller 122 is also able to turn off the main power of the local physical machine. Whether or not to turn off the main power of the local physical machine can be changed by the setting. This is effective when the active system (main system) and the standby system (subsystem) are switched between the local physical machine and the remote physical machine.

(2) Operation when the Main Power is OFF

The power supply monitoring unit 121 detects that the main power of the remote physical machine is OFF, via the communication controller 124. Further, the power supply monitoring unit 121 detects that the main power of the local physical machine is OFF.

When the power supply controller 122 detects that the main power of the local physical machine is ON, the power supply controller 122 turns off the main power of the local physical machine.

It should be noted that when detecting that the main power of the remote physical machine is OFF, the power supply controller 122 is able to turn off the main power of the local physical machine via the communication controller 124. Whether or not to turn off the main power of the local physical machine can be changed by the setting. This is effective when both the local physical machine and the remote physical machine are shut down simultaneously.

Further, when the power supply controller 122 detects that the main power of the remote physical machine is OFF, the power supply controller 122 is also able to turn on the main power of the local physical machine. Whether or not to turn on the main power of the local physical machine can be changed by the setting. This is effective when the active system (main system) and the standby system (subsystem) are switched between the local physical machine and the remote physical machine.

Further, the power supply monitoring unit 121 is able to detect a failure of the main power.

In general, it is difficult to detect a power failure of a physical machine by software (SW). The reason that it is difficult to detect a failure of the main power of the local physical machine by the software (SW) of the local physical machine is that if the main power of the local physical machine failed, it is highly likely that the software (SW) of the local physical machine stops.

The reason that it is difficult to detect a failure of the main power of the remote physical machine by the software (SW) of the local physical machine is that it is difficult to determine whether the main power of the remote physical machine failed or communications of the software (SW) of the remote physical machine stopped.

In the present embodiment, however, as the data communication card 10 monitors the power supply states of the local physical machine and the remote physical machine by the power supplied from the standby power, it is possible to detect an error at an early stage.

[Turn Off Main Power by Autonomous Control]

Hereinafter, an operation of turning off the main power by autonomous control will be described in detail.

When the data communication card 10 detects any failure as a result of any state monitoring (result of hardware state monitoring, software state monitoring, I/O chip state monitoring, or BMC state monitoring) described above, the data communication card 10 autonomously turns off the main power of the device in which the failure has occurred, without an interference of the software (SW) 30. In this step, the data communication card 10 may turn off the main power of the local physical machine or the remote physical machine.

For example, when the power supply controller 122 detects a failure of the local physical machine by the data communication card of the local system, the power supply controller 122 turns off the main power of the local physical machine.

Further, when the power supply controller 122 detects a failure of the remote physical machine by the data communication card of the local system, the power supply controller 122 turns off the main power of the remote physical machine via the communication controller 124.

In the present embodiment, as the data communication card 10 autonomously performs control to turn off the main power, it is possible to turn off the main power of the physical machine after the error has been detected, without an interference of software (SW).

[Turn On Main Power by Autonomous Control]

Hereinafter, an operation of turning on the main power by autonomous control will be described in detail.

When the data communication card 10 detects a failure of the remote physical machine, if the main power of the local physical machine is OFF, the data communication card 10 turns on the main power of the local physical machine.

The data communication card 10 detects a failure of the remote physical machine via the communication controller 124.

When a failure occurs in the remote physical machine, the power supply controller 122 turns on the main power of the local physical machine.

In the present embodiment, as the data communication card 10 autonomously detects a failure of the remote physical machine, it is possible to turn on the main power of the local physical machine after an error in the remote physical machine has been detected, without an interference of software (SW).

Thereby, in a duplex system including an active system and a standby system, the main power of the standby system (subsystem) devices can stand by in an OFF state until the main power is required to be turned on. Accordingly, the standby system (subsystem) devices are not required to stand by in a state where the main power is ON, whereby the power consumption of the entire system can be reduced significantly.

<Features of the Present Embodiment>

As described above, the present embodiment realizes early failure detection, failover, and cold standby, by adding a function of monitoring the states of the devices, a function of notifying the devices of the remote system of the states, and a function of controlling power supply, which are operable by the standby power, to a data communication card to be used for constructing a fault tolerant system or a cluster system at a software level in a general-purpose IA server.

By inserting a data communication card, having the above-described functions, into a general-purpose IA server, the data communication card autonomously and regularly checks whether the main components of the IA server operate normally, which enables early failure detection. Further, the data communication card is able to notify the devices of the remote system of the detected failure and allow the devices of the remote system to immediately transfer to failover processing.

Further, in the case where a multiplex system of an active/standby configuration using the data communication card, the standby-side devices can monitor the states of the devices of another system even if the main power is OFF, and when detecting a failure of the devices of the other system, the standby-side devices can turn on the main power autonomously.

As described above, the data communication card implements early failure detection and failover, and also implements autonomous cold standby without an interference of a third party.

In a conventional multiplex system in which failure detection has performed using a general purpose device, the failure detection capability of a general purpose device is low. For example, as it is able to detect a failure only when the failure detection function is operated, in a case where the device or the failure detection function does not run in the standby system or the like, a failure cannot be detected. Further, as it is impossible to notify the outside devices of a failure without an interference of the OS for multiplexing, the OS of each of the multiplex devices must be active. Further, the failure detection function of the OS for multiplexing does not work either until the OS for multiplexing starts operation. In general, as failure detection by software (SW) is performed by detecting a failure according to time-out, it takes time until a failure is detected. The present embodiment is able to solve these problems.

<Remarks>

While the embodiment of the present invention has been described in detail, the present invention is not limited to the above-described embodiment. It will be understood by those skilled in the art that various changes in form and details may be made therein without departing from the scope of the present invention.

REFERENCE NUMERALS 10 data communication card
11 FPGA (Field Programmable Gate Array)
111 processor
112 SW (software) state acquisition unit
113 PCI (Peripheral Components Interconnect bus) controller
114 communication controller
12 CPLD (Complex Programmable Logic Device)
121 power supply monitoring unit
122 power supply controller
123 SMBus (System Management Bus) controller
124 communication controller
20 hardware (HW)
30 software (SW)
40 driver
50 I/O (Input/Output) chip
60 BMC (Baseboard Management Controller)
100 (-$i$, $i=1$~$n$) physical machine

The invention claimed is:

1. A system for monitoring state information in a multiplex system comprising a first physical machine and a second physical machine wherein a first data communication card is installed in the first physical machine, the first data communication card comprising:
 a first LSI (Large Scale Integration) that is driven by power supplied from main power of the first physical machine of the own system, monitors internal states of the first physical machine and the second physical machine, and detects an internal abnormal state; and
 a second LSI that is driven by power supplied from standby power of the first physical machine, monitors power supply states of the first physical machine and the second physical machine, monitors states of a BMC (Baseboard Management Controller) of the first physical machine and a BMC of the second physical machine, and detects an abnormality in the BMCs.

2. The system for monitoring state information in the multiplex system according to claim 1, wherein
 the internal state of each of the first physical machine and the second physical machine monitored by the first LSI is one of, two of, or all of a hardware state, a software state, and an input/output state of each of the first physical machine and the second physical machine.

3. The system for monitoring state information in the multiplex system according to claim 1, wherein
 the first LSI comprises:
  a processor that controls an inside of the first data communication card;
  a software state acquisition unit that monitors a state of software operating on the first physical machine, and detects an abnormal state of the software;
  a PCI (Peripheral Components Interconnect bus) controller that monitors states of hardware and an I/O chip of the first physical machine, and detects an abnormal state of the hardware and the I/O chip; and
  a communication controller that performs transmission and reception of data with the second LSI, and performs transmission and reception of data with the second physical machine over the communication network, and
 the second LSI comprises:
  a power supply monitoring unit that monitors power supply states of the first physical machine and the second physical machine;
  a power supply controller that controls the power supply states of the first physical machine and the second physical machine;

an SMBus (System Management Bus) controller that monitors the state of the BMC in the first physical machine, and detects an abnormality in the BMC; and a communication controller that performs transmission and reception of data with the first LSI, and performs transmission and reception of data with the second physical machine over the communication network.

4. The system for monitoring state information in the multiplex system according to claim 3, wherein
when the second LSI is not able to receive power supply from the standby power of the first physical machine, the communication controller of the second LSI receives power supply from the standby power of the second physical machine over the communication network.

5. The system for monitoring state information in the multiplex system according to claim 1, wherein
the first data communication card is disposed on a circuit board of the first physical machine, and is provided between a CPU and an I/O chip in the first physical machine.

6. The system for monitoring state information in the multiplex system according to claim 1, wherein
the first data communication card is inserted in a card slot of the first physical machine, and is connected with a CPU in the first physical machine via a PCI (Peripheral Components Interconnect) Express bus.

7. A data communication card of a multiplex system comprising a first physical machine and a second physical machine which, the data communication card being installed in the first physical machine, the data communication card comprising:
a first LSI (Large Scale Integration) that is driven by power supplied from main power of the first physical machine, monitors internal states of the first physical machine and the second physical machine, and detects an internal abnormal state; and
a second LSI that is driven by power supplied from standby power of the first physical machine, monitors power supply states of the first physical machine and the second physical machine, monitors states of a BMC (Baseboard Management Controller) of the first physical machine and a BMC of the second physical machine, and detects an abnormality in the BMCs.

8. The data communication card according to claim 7, wherein
the internal state of each of the first physical machine and the second physical machine monitored by the first LSI is one of, two of, or all of a hardware state, a software state, and an input/output state of each of the first physical machine and the second physical machine.

9. The data communication card according to claim 7, wherein
the first LSI comprises:
a processor that controls an inside of the data communication card;
a software state acquisition unit that monitors a state of software operating on the first physical machine, and detects an abnormal state of the software;
a PCI (Peripheral Components Interconnect bus)-controller that monitors states of hardware and an I/O chip of the first physical machine, and detects an abnormal state of the hardware and the I/O chip; and
a communication controller that performs transmission and reception of data with the second LSI, and performs transmission and reception of data with the second physical machine over the communication network, and the second LSI comprises:
a power supply monitoring unit that monitors power supply states of the first physical machine and the second physical machine;
a power supply controller that controls the power supply states of the first physical machine and the second physical machine;
an SMBus (System Management Bus) controller that monitors the state of the BMC in the first physical machine, and detects an abnormality in the BMC; and
a communication controller that performs transmission and reception of data with the first LSI, and performs transmission and reception of data with the second physical machine over the communication network.

10. The data communication card according to claim 9, wherein
when the second LSI is not able to receive power supply from the standby power of the first physical machine, the communication controller of the second LSI receives power supply from the standby power of the second physical machine over the communication network.

11. The data communication card according to claim 7, wherein
the data communication card is disposed on a circuit board of the first physical machine, and is provided between a CPU and an I/O chip in the first physical machine.

12. The data communication card according to claim 7, wherein
the data communication card is inserted in a card slot of the first physical machine, and is connected with a CPU in the first physical machine via a PCI (Peripheral Components Interconnect) Express bus.

13. An abnormal state detection method for detecting an abnormal state performed by a data communication card comprising a first LSI (Large Scale Integration) and a second LSI, the data communication card being installed in a first physical machine of a multiplex system comprising the first physical machine and a second physical machine, the state detection method comprising:
by the first LSI driven by power supplied from main power of the first physical machine, monitoring internal states of the first physical machine and the second physical machine, and detecting an internal abnormal state; and
by the second LSI driven by power supplied from standby power of the first physical machine, monitoring power supply states of the first physical machine and the second physical machine, monitoring states of a BMC (Baseboard Management Controller) of the first physical machine and a BMC of the second physical machine, and detecting an abnormality in the BMCs.

* * * * *